US008920829B2

(12) United States Patent
Hargrove

(10) Patent No.: US 8,920,829 B2
(45) Date of Patent: Dec. 30, 2014

(54) RUMINANT FEED COMPOSITION AND METHOD OF MAKING

(75) Inventor: Garrard L. Hargrove, Birmingham, AL (US)

(73) Assignee: Agrium Advanced Technologies (U.S.) Inc., Sylacauga, AL (US)

( * ) Notice: Subject to any disclaimer, the term of this patent is extended or adjusted under 35 U.S.C. 154(b) by 221 days.

(21) Appl. No.: 12/730,737

(22) Filed: Mar. 24, 2010

(65) Prior Publication Data

US 2010/0233325 A1    Sep. 16, 2010

Related U.S. Application Data

(63) Continuation of application No. 11/393,763, filed on Mar. 31, 2006, now abandoned.

(51) Int. Cl.

| | | |
|---|---|---|
| *A23K 1/17* | (2006.01) | |
| *A23L 1/216* | (2006.01) | |
| *A23L 1/00* | (2006.01) | |
| *C08G 18/76* | (2006.01) | |
| *A23K 1/00* | (2006.01) | |
| *A23K 1/16* | (2006.01) | |
| *A23K 1/18* | (2006.01) | |
| *C08G 18/32* | (2006.01) | |
| *C08G 18/42* | (2006.01) | |
| *C08G 18/66* | (2006.01) | |
| *C09D 175/06* | (2006.01) | |

(52) U.S. Cl.
CPC ............ *C08G 18/7664* (2013.01); *A23K 1/005* (2013.01); *A23K 1/1631* (2013.01); *A23K 1/1813* (2013.01); *C08G 18/3278* (2013.01); *C08G 18/4213* (2013.01); *C08G 18/6655* (2013.01); *C09D 175/06* (2013.01)
USPC .............................. 424/442; 426/96; 426/303

(58) Field of Classification Search
CPC ... A23K 1/005; A23K 1/1631; A23K 1/1813; C08G 18/3278; C08G 18/4213; C08G 18/6655; C08G 18/7664; C09D 175/06; A26K 1/1846; A23L 1/0029; A23L 1/005
USPC .................................... 424/442; 426/96, 303
See application file for complete search history.

(56) References Cited

U.S. PATENT DOCUMENTS

| | | | |
|---|---|---|---|
| 3,541,204 A | 11/1970 | Sibbald et al. | |
| 3,959,493 A | 5/1976 | Baalsrud et al. | |
| 4,533,557 A | 8/1985 | Maruyama et al. | |
| 4,595,584 A | 6/1986 | Wu et al. | |
| 4,687,676 A | 8/1987 | Wu et al. | |
| 4,711,659 A * | 12/1987 | Moore ......................... | 504/231 |
| 4,716,659 A | 1/1988 | Barriquand et al. | |
| 4,804,403 A | 2/1989 | Moore | |
| 4,832,967 A * | 5/1989 | Autant et al. ................... | 426/96 |
| 4,877,621 A | 10/1989 | Ardaillon et al. | |
| 4,969,947 A | 11/1990 | Moore | |
| 4,983,403 A | 1/1991 | Ardaillon et al. | |
| 4,990,378 A * | 2/1991 | Jones ........................... | 427/420 |
| 5,227,166 A | 7/1993 | Ueda et al. | |
| 5,296,219 A | 3/1994 | Ardaillon et al. | |
| 5,616,339 A | 4/1997 | Prud'Homme et al. | |
| 5,871,773 A | 2/1999 | Rode et al. | |
| 6,682,751 B1 | 1/2004 | Hargrove et al. | |

OTHER PUBLICATIONS

International Preliminary Report on Patentability with Written Opinion, International Application No. PCT/US2007/07398, mailed Aug. 11, 2008, 4 pgs.
International Search Report, International Application No. PCT/US2007/07398, mailed Aug. 11, 2008, 1 pg.

* cited by examiner

*Primary Examiner* — Aradhana Sasan
(74) *Attorney, Agent, or Firm* — Kagan Binder, PLLC

(57) ABSTRACT

A nutrient or medicinal composition for administration to ruminants, which includes a core of one or more biologically active substances coated with a film of polyurethane, overcoated with an "intermediate" wax is disclosed. This polyurethane/wax coating is resistant to rumen conditions, but will release the biologically active substance(s) in the abomasum and subsequent digestive tract of the ruminant animal.

36 Claims, No Drawings

RUMINANT FEED COMPOSITION AND METHOD OF MAKING

CROSS-REFERENCE TO RELATED APPLICATION

This application is a Continuation of U.S. patent application Ser. No. 11/393,763, filed Mar. 31, 2006 that is hereby incorporated by reference in its entirety.

TECHNICAL FIELD

The present invention relates to feed additives for ruminants. More particularly, the invention relates to a feed additive composition and method of making comprising a biologically active substance that is coated with a coating composition which minimizes release of the biologically active substance in the rumen, but provides for the primary release of the biologically active substance in the abomasum and subsequent digestive tract of the ruminant animal.

BACKGROUND

Increasing the milk production of lactating dairy cattle, and meat production in cattle raised for meat, is an ongoing challenge to the farmer. It is possible to provide, or even exceed, the crude protein requirements of these animals when seeking higher milk or meat production. However, due to the nature of the ruminant digestive system, it may not be possible to "balance" the higher crude protein intake with essential amino acids or other biologically active substances required for the higher milk or meat output. Unfortunately, direct oral administration of the biologically active substances results in their being decomposed by the microorganisms present in the rumen, which is essentially a very efficient bioreactor.

More specifically, the digestive system of a ruminant animal originally evolved to allow it to benefit from feeds for which there was little competition from non-ruminants. In a ruminant, ingested feed is first chewed and then passes into the ruminant's four chambered "stomach." The ruminant's four chambered "stomach" and their functions are now specifically considered. The first chamber, namely the reticulum, aids in bringing boluses of feed back to the mouth for rechewing. It is also kind of a "drop out box" for heavy objects that the animal may have ingested. The chewed, and rechewed feed then passes from the reticulum into the next chamber of the ruminant's stomach, called the rumen, where it is subjected to anaerobic fermentation. This microbial fermentation begins the digestive process and gives the ruminant the ability to utilize fibrous feeds that the mammalian system alone cannot break down due to the lack of necessary enzyme systems. The ruminant animal subsequently meets its nutrient needs by utilizing the by-products of this extensive fermentation, such as volatile fatty acids, along with any undigested feed residues and the resultant microbial mass that passes from the rumen. The normal pH of the rumen is 6 to 7. Once the feed has been reduced in size by chewing and digestion by the bacteria and protozoa in the rumen, it passes into the next compartment of the ruminant's stomach called the omasum. Also moving from the rumen to the omasum is a portion of the microbial mass that develops in the rumen. In addition, the omasum absorbs a large portion of the volatile fatty acids that move from the rumen to the omasum because they were not absorbed through the rumen wall. The omasum is also thought to absorb water and electrolytes such as potassium and sodium. The material in the omasum, then passes into the abomasum, the fourth, and final chamber of the ruminant's stomach. The abomasum is called the "true" stomach because it functions in a manner very similar to the stomach of a man or a pig. The walls of the abomasum secrete enzymes and hydrochloric acid. The pH of the digesta coming into the abomasum is about 6 to 7, but is quickly lowered to about 2.5 by the acid. This creates a proper environment for the enzymes to function. A primary digestive function of the abomasum is the partial breakdown of proteins. The enzyme pepsin is mainly responsible for protein breakdown. Proteins from the feed and the microorganism mass coming from the rumen are broken down into smaller units called peptides before leaving the abomasum.

The remaining parts of the ruminant digestive system, the small and large intestines, function just as they do in man or pig. In the upper half of the small intestine, digesta are further broken down, proteins into amino acids, starch to glucose, and complex fats into fatty acids. The amino acids, glucose and fatty acids are then absorbed in the lower half of the small intestine. The digesta leaving the small intestine enters the large intestine where water is absorbed, thus making the digesta more solid. Bacteria living in the large intestine work at digesting any feedstuffs which escaped digestion earlier. This usually contributes less than 15% of the total digestion. The final step in the ruminant digestive process is excretion from the large intestine.

As noted above, modern farmers seek to optimize milk and meat production by feeding the respective cattle an optimum diet. Providing sufficient crude protein in the diet is a relatively straight forward task. However, supplying sufficient quantities of essential amino acids to balance the crude protein intake and promote optimum milk and meat production has proved difficult or not possible. One of the reasons is the design of the ruminant digestive system, and in particular, the breakdown of amino acid compositions in the rumen prior to their reaching the abomasum and small intestine where these essential nutrients can be absorbed in the ruminant's small intestine.

The prior art discloses various ruminant feed compositions having biologically active substances useful in providing the desired amino acid to the ruminant which are said not to break down in the rumen and provide for release of the substance in the remaining stomachs of the ruminant. For example, U.S. Pat. No. 4,832,967 discloses a composition consisting of a biologically active substance which is stable in a medium whose pH is greater than 5 and which permits release of the substance in a medium whose pH is less than 3.5. This is said to be achieved using a precoating layer, a first coating layer sensitive to pH variations and a second coating layer of a hydrophobic substance.

Also known is U.S. Pat. No. 5,227,166 which discloses a composition consisting of a biologically active substance and a coating having lecithin, an inorganic substance which is stable under neutral conditions and a specific monocarboxylic acid having 14 to 22 carbon atoms, hardened vegetable oils, hardened animal oils and waxes.

Further known is U.S. Pat. No. 4,533,557 which discloses tablets or granules of a mixture of a biologically active substance, chitosan and protective materials of saturated or unsaturated aliphatic monocarboxylic acid having 14 to 22 carbon atoms, hardened vegetable oils and hardened animal oils. The chitosan is said to allow the biologically active substance of the composition to pass through the rumen and release in the abomasum.

Other prior art patents discuss additional compositions as ruminant feed additives including U.S. Pat. Nos. 3,541,204; 3,959,493; 4,595,584; 4,687,676; 4,877,621; 4,983,403; 5,616,339; 5,296,219, and 5,871,773.

In other fields it has also been recognized that fertilizer and pesticide products can be applied to a soil environment in order to control the release of the fertilizer or pesticide over a period of time. with respect to fertilizers, this permits a single application of the fertilizer which will last several months and possibly an entire growing season, avoiding the need for further applications. For example, U.S. Pat. Nos. 4,716,659; 4,804,403, and 4,969,947, assigned to the assignee of the present application, disclose an attritionresistant, controlled-release fertilizer comprising a water-soluble central mass, such as urea, containing nucleophilic reaction functional groups surrounding and chemically bonded to a base coating formed by reacting a molecular excess of a coupling agent, such as a polyisocyanate, with the nucleophilic groups of the central mass and a water-insoluble layer surrounding and chemically bonded with the base coating formed by the reaction and polymerization of the excess functional groups of the coupling agent. These products provide outstanding controlled-release fertilizer products. Similarly, U.S. Pat. No. 6,682,751, also assigned to the assignee of the present application, discloses a controlled release pesticide composition and method of making a controlled release pesticide composition providing outstanding controlled-release pesticide products.

These compositions and methods of the prior art ruminant feeds have various shortcomings including their efficiency in providing amino acid release in the abomasum, they are expensive and/or difficult to manufacture or simply can stand improvement. These and other shortcomings of these compositions and methods are addressed by the present invention.

SUMMARY

The present invention overcomes the problem of moving a biologically active substance through the rumen with little degradation, and yet allows the biologically active substance to be available in the abomasum and subsequent digestive tract for use by the ruminant animal. The composition of the invention comprises an inner core of a biologically active substance, preferably being spherical and having a smooth surface; a polyurethane coating surrounding the inner core of the biologically active substance, and a wax coating of the "intermediate type" coating the polyurethane coating which surrounds the inner core. The composition of the invention takes advantage of the biological activity of the rumen, abomasum, small intestine, and large intestine. The passage of the coated biologically active substance through the rumen exposes the outer wax coating to the rumen contents, which begin to degrade the wax coating. However, the outer wax coating and the inner polyurethane coating serve to protect the core of biologically active substance from the rumen contents, so that the core material is released only minimally during the passage of the coated core through the rumen. As the coated core moves out of the rumen and into the remainder of the animal's digestive tract, the wax coating is further degraded. This allows the inner core contents to be released over the time of transit through the abomasum, small intestine, and large intestine, for the benefit of the ruminant animal.

A primary object of the present invention is to provide a composition having a biologically active substance which will not significantly release in the rumen but will primarily release in the abomasum and subsequent digestive tracts of the ruminant. A preferred biologically active substance is an amino acid, preferably lysine, which will provide for increased milk production in dairy cattle or meat production in meat cattle.

Another primary object of the present invention is to provide a composition having a biologically active substance having a protective coating which coating prevents significant release of the biologically active substance in the rumen. A preferred coating comprises a first polyurethane coating layer and a second coating layer of an intermediate wax.

Another primary object of the present invention is to provide a ruminant feed additive which will provide essential amino acid to the ruminant to increase milk or meat production comprising an inner core of a granular lysine having a particle size in the range of about 0.8 nun to about 2.5 mm, a first coating formed in situ on the lysine granules and an intermediate wax coating formed on the polyurethane coating. A preferred polyurethane coating is formed by a polymeric diphenylmethane diisocyanate and a polymeric polyester polyol blended with triethanolamine.

Another primary object of the present invention is to provide a composition and method of making the ruminant feed additive which provides for reliable and predictable release of a biologically active substance in the ruminant's abomasum and subsequent digestive tracts.

Another object of the present invention is to provide a ruminant feed composition and method of making which is effective, cost efficient and/or easier to make and less complex than the prior art methods and compositions.

These primary and other objects of the invention will be apparent from the following description of the preferred embodiments of the invention.

DETAILED DESCRIPTION OF THE PREFERRED EMBODIMENTS

The present invention will be described with respect to a ruminant feed additive composition comprising lysine as the inner core of biologically active material; a polyurethane coating surrounding the inner core of biologically active material, and a wax coating surrounding the polyurethane coating. However, it is understood that other biologically active substances and coatings may be used in the invention as discussed herein and known to those skilled in the art.

Biologically active substances useful in the invention may comprise substances which will aid in milk and/or meat production of the ruminant animal and include amino acids including any lysine and methionine. It is further understood that the composition of the invention may include one or more biologically active substances. Other biologically active substances known to those skilled in the art are included within the scope of the invention and the invention is not limited to the preferred embodiments disclosed herein. Additionally, it is understood that the coating of the present invention may be useful on other biologically active substances including other nutrients or medicaments.

A presently preferred biologically active substance is lysine. Lysine is highly soluble and has been difficult to provide as an effective feed additive to the ruminant. When provided in effective amounts, as in the invention disclosed herein, it will aid in milk or meat production of cattle. The preferred lysine is a granulated lysine having the following attributes. The particle size is preferably in the range of about 0.8 mm to about 2.5 mm, and more preferably is in the range of about 0.8 mm to about 1.2 mm. The lysine assay is 50% minimum. The moisture content is 5.0% maximum, and the bulk density is 0.70–0.07 grams/cc. A lysine product useful in the invention is BIOLYS® manufactured by Degussa Corporation.

The coating material coating the biologically active substance is a polymer coating capable of not degrading in the rumen and providing for controlled-release of the biologically active substance in the abomasum and digestive tract. The preferred polymer coating is a polyurethane coating. The polyurethane coating is preferably in the range of about 8 to about 25 micrometers in thickness and more preferably in the range of about 12 to about 20 micrometers in thickness. It is understood that the thickness of the polymer coating may vary depending on the biologically active substance and the polymer, the primary emphasis being to allow rumen by-pass and release of the biologically active material in the abomasum and subsequent digestive tract. A polyurethane coating useful in the invention is formed using polymeric diphenylmethane diisocyanate ("polymeric MDI") and a polymeric polyester polyol blended with triethanolamine. A preferred polyurethane coating is formed using polymeric MDI having the following attributes: 25% to 35% isocyanate value; a viscosity in the range of 50 centipoise to 300 centipoise at 25° C. (77° F.), and an average functionality of 2.3 to 2.7. A polymeric MDI useful in the invention is MONDUR® MR Light manufactured by Bayer Corporation. A preferred polymeric polyester polyol is produced via the transesterification of dimethylterephthalate with glycol and having a viscosity of 2500 centipoise to 5000 centipoise at 25° C. (77° F.), and an average functionality of 2. A polymeric polyester polyol useful in the invention is TERATE® 258 manufactured by Investa Corporation.

A method of forming the polyurethane coating is generally disclosed in U.S. Pat. No. 6,537,611, assigned to the assignee of this application, and which is incorporated herein by reference.

The following examples illustrate the novelty and benefits of the invention. Example 1 is a comparative example illustrating a composition which does not provide the benefits of the present invention. Examples 2 and 3 disclose preferred compositions of the invention and methods of making the compositions of the invention.

EXAMPLE 1

3000 grams of granulated lysine, BIOLYS® (Degussa Corporation), average diameter 1.14 mm, were transferred into a stainless steel coating drum which contains lifting and mixing flights and was rotated at 38 revolutions per minute. The 3000 grams of granulated lysine were heated to 175° F. (79.4° C.) using a laboratory heat gun. A first polyurethane coating layer was provided on the lysine as follows:

1) 2.8 grams of polymeric MDI (p-MDI) (MONDUR® MR Light, Bayer Corporation) were injected into the most active part of the bed of tumbling granules, and 30 seconds were allowed for the p-MDI to evenly spread over the surface of the granules. Then 8.5 grams of a blend of 90% polyester polyol (TERATE® 258, Investa Corporation) and 10% triethanolamine, were injected into the most active part of the bed and 60 seconds were allowed for the polyester polyol/triethanolamine to evenly spread over the surface of the granules. At the conclusion of the 60 seconds, 4.3 grams of p-MDI were injected into the most active part of the bed and 30 seconds were allowed for the p-MDI to evenly spread over the surface of the granules. After the conclusion of the 30 second spread time for the p-MDI injection, an additional 60 seconds were allowed to complete the reaction to form the first polyurethane coating layer. The granules were maintained at a temperature of 175° F. (79.4° C.) during this coating process.

2) Step (1) was repeated 7 more times to provide a total polyurethane coating of 124.8 grams on the granulated lysine or a coating thickness of approximately 8.8 micrometers.

3) At the conclusion of the last polyurethane coating layer, 27 grams of molten Intermediate Wax, CITGO HI-618 wax (Citgo Petroleum Corporation) were injected into the most active part of the bed and 60 seconds were allowed for the wax to spread evenly over the granulated lysine and providing for a wax coating thickness of approximately 3.0 micrometers.

4) The coated product was then cooled down to 115° F. (46.1° C.) and removed from the coating drum.

5) The resulting coated lysine product has a polyurethane coating of 3.96% (thickness of approximately 8.8 micrometers), and an outer wax coating of 0.86% (thickness of approximately 3.0 micrometers). 20 grams of the coated product were placed in 100 ml of deionized water which was thermostated at 102° F. (38.9° C.), and the release of the lysine was measured over a period of 18 hours. The results of this release test are shown in Table 1 below.

TABLE 1

| Hours in test | % Cumulative Lysine Release |
| --- | --- |
| 1 | 0.0 |
| 2 | 4.3 |
| 4 | 7.5 |
| 6 | 15.3 |
| 8 | 24.5 |
| 10 | 32.7 |
| 12 | 43.4 |
| 14 | 51.3 |
| 16 | 60.8 |
| 18 | 67.8 |

6) The coated product from Example 1 was tested for "rumen bypass" using ruminally cannulated Jersey cows. The product was exposed to the rumen of the cows for 16 hours, and the amount of lysine still present in the coated product was measured. It was found that 18.7% of the lysine originally present was still present at the end of the rumen exposure period. The uncoated lysine granules were also exposed to the rumen in a similar test, and after 16 hours of exposure, 16.5% of the lysine originally present was still present. The difference between the coated and uncoated lysine results was not statistically significant. Thus, the product from Example 1, coated with almost 4% polyurethane, and almost 0.9% intermediate wax, did not yield any better rumen bypass than the uncoated lysine granules.

EXAMPLE 2

2765 grams of granulated lysine, BIOLYS® (Degussa Corporation), average diameter 1.00 mm, were transferred into a stainless steel coating drum which contains lifting and mixing flights and was rotated at 38 revolutions per minute. The 2765 grams of granulated lysine were heated to 175° F. (79.4° C.) using a laboratory heat gun. A first polyurethane coating layer was provided on the lysine as follows:

1) 3.2 grams of polymeric MDI (p-MDI) (MONDUR® MR Light, Bayer Corporation) were injected into the most active part of the bed of tumbling granules, and 30 seconds were allowed for the p-MDI to evenly spread over the surface of the granules. Then 7.1 grams of a blend of 90% polyester polyol (TERATE® 258, Investa Corporation) and 10% triethanolamine, were injected into the most active part of the bed and 60 seconds were allowed for the polyester polyol/triethanolamine to evenly spread over the surface of the granules. At the conclusion of the 60 seconds, 4.7 grams of p-MDI were injected into the most active part of the bed and 30 seconds were allowed for the p-MDI to evenly spread over the surface of the granules. After the conclusion of the 30 second spread time for the p-MDI injection, an additional 60 seconds were allowed to complete the reaction to form the first polyurethane coating layer. The granules were maintained at a temperature of 175° F. (79.4° C.) during this coating process.

2) Step (1) was repeated 15 more times to provide a total polyurethane coating of 240 grams on the granulated lysine or a coating thickness of approximately 16.1 micrometers.

3) At the conclusion of the last polyurethane coating layer, 27.7 grams of molten Intermediate Wax, CITGO HI-618 wax (Citgo Petroleum Corporation) were injected into the most active part of the bed and 60 seconds were allowed for the wax to spread evenly over the granulated lysine and providing for a wax coating thickness of approximately 3.0 micrometers.

4) The coated product was then cooled down to 115° F. (46.1° C.) and removed from the coating drum.

5) The resulting coated lysine product has a polyurethane coating of 7.91% (thickness of approximately 16.1 micrometers), and an outer wax coating of 0.91% (thickness of approximately 3.0 micrometers). 20 grams of the coated product were placed in 100 ml of deionized water which was thermostated at 102° F. (38.9° C.), and the release of the lysine was measured over a period of 28 hours. The results of this release test are shown in Table 2 below.

TABLE 2

| Hours in test | % Cumulative Lysine Release |
| --- | --- |
| 1 | 0.0 |
| 2 | 0.0 |
| 4 | 0.0 |
| 8 | 0.0 |
| 10 | 1.3 |
| 12 | 1.9 |
| 16 | 2.2 |
| 24 | 5.1 |
| 26 | 6.3 |
| 28 | 7.8 |

6) The coated lysine product from Example 2 was tested as follows for ruminal and intestinal digestibility.

Ruminal and intestinal digestibility of the product from Example 2 were determined in a replicated randomized block using three lactating Jersey cows fitted with ruminal and duodenal cannulas. Approximately 10 g of the test product was weighed into a 5 cm×10 cm bags (ANKOM #510, average pore size of 50±15 microns). Each bag was heat sealed twice. Twenty-four bags were prepared plus 12 blanks Individual bags were placed into a laundry bag by cow and replicate and labeled accordingly. Immediately before insertion into the rumen, bags were soaked in 39° C. (102.2° F.) water for approximately 5 minutes to wet the test material. Bags were inserted in the rumen and removed 16 hours after insertion. Upon removal from the rumen, the bags were immediately placed in ice water until they could be washed three times. The bags were then immediately dried in a forced air oven at 55° C. (131° F.) for 24 hours. The dried bags were weighed and contents composited by treatments within cow and replicate. Ruminal digestibility of the lysine was calculated for each sample.

Intestinal digestibility was determined by mobile bag technique. Approximately 0.8 g of sample was weighed into the 5×6 cm polyester bag (ANKOM #510 cut to approximately 6 cm in length) and heat sealed twice. A total of sixteen, bags for each replicate were prepared for insertion. The bags for the intestinal digestibility phase were soaked in pepsin-HCl solution (100 mg pepsin per liter of 0.01 N HCl) for 2 hours at 39° C. (102.2° F.) in a shaking water bath. Enough HCl was added to decrease pH to 2.4. Upon removal, the bags were rinsed with distilled water and kept at −18° C. (−0.4° F.) until introduction into the duodenum. One bag was inserted into the duodenal cannula each day every 15 minutes following a meal for a three-hour period (total of 12 bags per cow per insertion). Bags were collected from the feces from 8 to 20 hours after initial insertion. Upon recovery, bags were rinsed under tap water until the rinse water was clear. Bags were dried at 55° C. (131° F.) and residue pooled by replicate within cow for analyses of lysine. The results of the animal tests for the product from Example 2 were:

a) lysine content after 16 hour exposure to rumen=70.1% of amount originally present.

b) lysine digestibility in intestine=79.2%. Therefore, the amount of lysine that escapes the rumen and is digested in the intestine for the product from Example 2 is 70.1%×0.792=55.5% of amount originally present.

EXAMPLE 3

3000 grams of granulated lysine, BIOLYS® (Degussa Corporation), average diameter 1.10 mm, were transferred into a stainless steel coating drum which contains lifting and mixing flights and was rotated at 38 revolutions per minute. The 3000 grams of granulated lysine were heated to 175° F. (79.4° C.) using a laboratory heat gun. A first polyurethane coating layer was obtained as follows:

1) 3.3 grams of polymeric MDI (p-MDI) (MONDUR® MR Light, Bayer Corporation) were injected into the most active part of the bed of tumbling granules, and 30 seconds were allowed for the p-MDI to evenly spread over the surface of the granules. Then 7.7 grams of a blend of 90% polyester polyol (TERATE® 258, Investa Corporation) and 10% triethanolamine, were injected into the most active part of the bed and 60 seconds were allowed for the polyester polyol/triethanolamine to evenly spread over the surface of the granules. At the conclusion of the 60 seconds, 5.1 grams of p-MDI were injected into the most active part of the bed and 30 seconds were allowed for the p-MDI to evenly spread over the surface of the granules. After the conclusion of the 30 second spread time for the p-MDI injection, an additional 60 seconds were allowed to complete the reaction to form the first polyurethane coating layer. The granules were maintained at a temperature of 175° F. (79.4° C.) during this coating process.

2) Step (1) was repeated 14 more times to provide a total polyurethane coating of 241.5 grams on the granulated lysine or a coating thickness of approximately 16.5 micrometers.

3) At the conclusion of the last polyurethane coating layer, 45.0 grams of molten Intermediate Wax, CITGO HI-618 wax (Citgo Petroleum Corporation) were injected into the most active part of the bed and 60 seconds were allowed for the wax to spread evenly over the granulated lysine and providing for a wax coating thickness of approximately 4.9 micrometers.

4) The coated product was then cooled down to 115° F. (46.1° C.) and removed from the coating drum.

5) The resulting coated lysine product has a polyurethane coating of 7.35% (thickness of approximately 16.5 micrometers), and an outer wax coating of 1.37% (thickness of approximately 4.9 micrometers). 20 grams of the coated product were placed in 100 ml of deionized water which was thermostated at 102° F. (38.9° C.), and the release of the lysine was measured over a period of 28 hours. The results of this release test are shown in Table 3 below.

TABLE 3

| Hours in test | % Cumulative lysine release |
| --- | --- |
| 1 | 0.0 |
| 2 | 0.0 |
| 4 | 0.0 |
| 6 | 0.6 |
| 8 | 0.7 |
| 10 | 1.0 |
| 12 | 1.1 |
| 16 | 1.1 |
| 24 | 1.8 |
| 28 | 10.4 |

6) The coated lysine product from Example 3 was tested for ruminal and intestinal digestibility in the same way as was the coated lysine product from Example 2.

The results of the animal tests for the product from Example 3 were:

a) lysine content after 16 hours of exposure to rumen=97.6% b) lysine digestibility in intestine=62.0%. Therefore, the amount of lysine that escapes the rumen and is digested in the intestine for the product from Example 3 is 97.6%×0.62=60.5%

The above Examples 2 and 3 illustrate the effectiveness of the present invention. The ruminant feed of the present invention provides for a release of the lysine primarily in the abomasum and subsequent digestive tract of the ruminant. It provides for predictability of release and is generally inexpensive and not difficult to manufacture. Thus, an effective composition of the invention comprises a composition which will have a lysine content after about 16 hours exposure to the rumen of at least 60% of amount originally present, and more preferably in the range of about 70% to about 100% of amount originally present.

The ruminant feed composition of the invention is preferably mixed with other ruminant feed rations. Based on the predictability of the release of the biologically active substance those skilled in the art will be able to determine the appropriate amount of the ruminant feed additive for the ruminant's diet.

The ruminant feed composition of the invention is preferably mixed with other ruminant feed rations. Based on the predictability of the release of the biologically active substance those skilled in the art will be able to determine the appropriate amount of the ruminant feed additive for the ruminant's diet.

It is claimed:

1. A ruminant feed composition comprising a core material of at least one biologically active substance coated with a polyurethane coating formed in in situ on the core material, and an outer intermediate wax coating surrounding the polyurethane coating, wherein said polyurethane coating and intermediate wax coating provide for effective non-release of the biologically active substance in a rumen of a ruminant animal.

2. The ruminant feed composition of claim 1 wherein the biologically active substance is an amino acid.

3. The ruminant feed composition of claim 1 wherein the biologically active substance is selected from the group consisting of lysine and methionine.

4. The ruminant feed composition of claim 1 wherein the polyurethane coating is formed in in situ from a diisocyanate and a polyol.

5. The ruminant feed composition of claim 4 wherein the diisocyanate is polymeric diphenylmethane diisocyanate.

6. The ruminant feed composition of claim 5 wherein the polyol is a polyester polyol blended with triethanolamine.

7. The ruminant feed composition of claim 3 wherein the biologically active substance is a spherical granule having a granule size of about 0.8 mm to about 2.5 mm.

8. The ruminant feed composition of claim 1 wherein the polyurethane coating has a thickness in a range of about 12 to about 20 micrometers.

9. The ruminant feed composition of claim 1 wherein the wax coating has a thickness in a range of about 3 to about 6 micrometers.

10. The ruminant feed composition of claim 1 further comprising other ruminant feed rations.

11. A ruminant feed composition comprising a core material of at least one biologically active substance comprising lysine with a polyurethane polymer coating formed in in situ on the core material, and an outer intermediate wax coating surrounding the polyurethane coating, wherein said polyurethane polymer coating and intermediate wax coating provide for effective non-release of the biologically active substance in a rumen of a ruminant animal.

12. The ruminant feed composition of claim 11 wherein the lysine is granular and has a particle size in a range of about 0.8 mm to about 2.5 mm.

13. The ruminant feed composition of claim 12 wherein the polyurethane polymer coating is formed in in situ from a diisocyanate and a polyol.

14. The ruminant feed composition of claim 13 wherein the diisocyanate is a polymeric diphenylmethane diisocyanate.

15. The ruminant feed composition of claim 14 wherein the polyol is a polyester polyol blended with triethanolamine.

16. The ruminant feed composition of claim 15 wherein the polyurethane coating has a thickness in a range of about 12 to about 20 micrometers.

17. The ruminant feed composition of claim 16 wherein the wax coating has a thickness in a range of about 3 to about 6 micrometers.

18. A method of making a ruminant feed composition comprising coating a core material of at least one biologically active substance with a polyurethane coating formed in in situ on the core material; applying an intermediate wax coating to surround the polyurethane coating, wherein said polyurethane coating and intermediate wax coating provide for effective non-release of the biologically active substance in rumen of a ruminant animal.

19. The method of claim 18 wherein the biologically active substance is an amino acid.

20. The method of claim 18 wherein the biologically active substance is selected from the group consisting of lysine and methionine.

21. The method of claim 18 wherein the polymer coating is formed in in situ from a diisocyanate and a polyol.

22. The method of claim 21 wherein the diisocyanate is polymeric diphenylmethane diisocyanate.

23. The method of claim 22 wherein the polyol is a polyester polyol blended with triethanolamine.

24. The method of claim 20 wherein the biologically active substance is a spherical granule having a granule size of about 0.8 mm to about 2.5 mm.

25. The method of claim 20 wherein the biologically active substance is a granule having a particle size in a range of about 0.8 mm to about 1.2 mm.

26. The method of claim 18 wherein the polymer coating has a thickness in a range of about 12 to about 20 micrometers.

27. The method of claim 18 wherein the wax coating has a thickness in range of about 3 to about 6 micrometers.

28. The method of claim 26 wherein the wax coating has a thickness in a range of about 3 to about 6 micrometers.

29. A ruminant feed composition comprising a core material of at least one biologically active substance comprising lysine with a polyurethane coating formed in in situ on the core material, and an intermediate wax coating surrounding the polyurethane coating, wherein the polyurethane coating has a thickness in a range of from about 12 to about 20 micrometers and the intermediate wax coating has a thickness in a range of from about 2 to about 7 micrometers.

30. The ruminant feed composition of claim 29, wherein the intermediate wax coating has a thickness in a range of from about 3 to about 6 micrometers.

31. The ruminant feed composition of claim 29, wherein the lysine is granular and has a particle size in a range of about 0.8 mm to about 2.5 mm.

32. The ruminant feed composition of claim 29, wherein the intermediate wax coating comprises a wax derived from a high boiling lubricating oil distillate.

33. The ruminant feed composition of claim 29, wherein the intermediate wax coating comprising a wax having an initial boiling point of about 718° F.

34. The ruminant feed composition of claim 29, wherein the intermediate wax coating comprising a wax having a minimum drop point of about 160° F., as measured pursuant to ASTM D-127.

35. The ruminant feed composition of claim 29, wherein the intermediate wax coating comprising a wax having a viscosity in the range of from 7.07 to 8.53 cSt at 100° C. as measured pursuant to ASTM D-445.

36. A ruminant feed composition comprising:
a core material of at least one biologically active substance coated with a polyurethane coating formed in in situ on the core material, wherein the biologically active substance is selected from the group consisting of lysine and methionine, and wherein the biologically active substance is a spherical granule size of about 0.8 mm to about 2.5 mm;
and an outer intermediate wax coating surrounding the polyurethane coating, wherein the polyurethane coating and intermediate wax coating provide for effective non-release of the biologically active substance in a rumen of a ruminant animal, wherein the polyurethane coating is formed in in situ from polymeric diphenylmethane diisocyanate and a polyester polyol blended with triethanolamine, and wherein the polyurethane coating has a thickness of about 12 to about 20 micrometers and the wax coating has a thickness from about 3 to about 6 micrometers.

* * * * *